United States Patent Office 2,801,254
Patented July 30, 1957

2,801,254
1-PHENYL-3,5-PYRAZOLIDINEDIONES AS ANTI-OXIDANTS FOR FATS AND OILS

Gerald R. Lappin and Clarence E. Tholstrup, Kingsport, Tenn., assignors to Eastman Kodak Company, Rochester, N. Y., a corporation of New Jersey No Drawing. Application July 25, 1955,
Serial No. 524,276

7 Claims. (Cl. 260—398.5)

This invention relates to the stabilization of organic materials which are normally subject to oxidative deterioration and is particularly concerned with stabilized organic compositions such as stabilized fats and fatty oils.

A large number of organic materials including fats, fatty oils and hydrocarbons such as ethylene, polyethylene and the like are normally subject to the deleterious effects of oxidation upon storage. As a consequence, it is usually desirable to incorporate in such oxidizable materials a small amount of a stabilizing material which is effective to reduce the oxidation to an unobjectionable level.

It is accordingly an object of this invention to provide new and improved stabilized compositions containing as a stabilizer, materials which have not been used heretofore as antioxidants and which have an unusually high antioxidant potency.

Another object of the invention is to stabilize normally oxidative materials such as fats, fatty oils, and hydrocarbons by the incorporation therein of a new and highly advantageous antioxidant material.

Another object of the invention is to facilitate the storage of materials which are normally subject to the deleterious effects of oxidation by providing a highly effective class of antioxidants based on 1-phenyl-3,5-pyrazolidinedione.

Other objects will be apparent from the description and claims which follow.

These and other objects are accomplished by means of this invention wherein organic materials which are normally subject to oxidation are stabilized by incorporating therein 1-phenyl-3,5-pyrazolidinedione and derivatives thereof as defined hereinafter. The stabilizers embodying the invention all have the common structure of 1-phenyl-3,5-pyrazolidinedione but may contain substituents on the phenyl radical.

1-phenyl-3,5-pyrazolidinedione has been previously described in the literature but its antioxidant value has not been recognized heretofore. The derivatives of 1-phenyl-3,5-pyrazolidinedione which contain a substituent on the phenyl nucleus can be produced in the same manner beginning with the corresponding compounds containing the correspondingly substituted phenyl nucleus. As described in U. S. Patents 2,454,075 and 2,458,780, certain of the pyrazolones and pyrazalines have been used as stabilizers for oxidizable materials. However, the compounds employed in practicing this invention have unexpectedly high antioxidant potency and are chemically completely distinct.

The antioxidants embodying the invention can be represented by the following general formula:

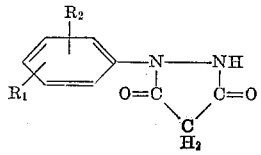

wherein each of $R_1$ and $R_2$ represent a hydrogen atom, an alkyl radical containing from 1 to 8 carbon atoms, an alkoxy radical containing from 1 to 8 carbon atoms, an aryl radical of the benzene series containing from 6 to 9 carbon atoms, or a hydroxyl radical.

As can be seen, the antioxidant materials described by the preceding general formula can be varied by the use of different substituents on the phenyl nucleus. However, it has been found that relatively minor changes resulting from adding substituents to the 3,5-pyrazolidinedione nucleus markedly change the antioxidant activity of these materials. This situation is quite clearly shown by the table presented hereinbelow.

The various antioxidant compounds covered by the general formula given above are highly effective stabilizers for organic materials normally subject to oxidative deterioration. These stabilizers can be used in relatively small amounts such as from 0.001% to 1.0% by weight. Larger and smaller amounts can also be employed. An amount of about 0.01% is generally effective in many organic materials normally subject to oxidative deterioration. Higher amounts, such as 1% or 2% or higher can also be used, although such higher amounts are usually not necessary or economical because of the relatively smaller gain in the stability obtained when the amount of stabilizer employed approaches 1% or more.

In addition to employing the compounds of this invention alone, these compounds can be mixed with other known antioxidants and known synergists to produce stabilizer compositions which can be advantageously employed in the stabilization of organic materials normally subject to oxidative deterioration. Examples of such additional components include butylated hydroxyanisole, 2,5-ditertiarybutyl hydroquinone, 2,6-ditertiary butyl-4-methylphenol, citric acid, propyl gallate, and various other compounds insofar as any of these are compatible with the compounds set forth in the above-described general formula. Any of these mixtures or a mixture of two or more of the compounds covered by the general formula set forth hereinabove can be employed in the form of a solution in a suitable organic solvent so as to facilitate the incorporation of the antioxidant composition into the material to be stabilized.

The materials which can be stabilized in accordance with this invention include any of the organic materials normally subject to oxidative deterioration, including the hydrocarbons such as gasoline, fuels oils, polyethylene, rubber and the like. Other materials which can be stabilized included plastics, waxes, soap, fatty materials which include any of the fats or fatty oils normally subject to oxidation, etc. Such fats and fatty oils include the free fatty acids such as oleic acid and the like as well as the animal fats and vegetable oils. Thus, for example, the fatty materials include any of the triglyceride fats and glyceryl partial esters as exemplified by lard, tallow, cottonseed oil, peanut oil, butter, corn oil, coconut oil, monoglycerides and diglycerides of these and similar fatty materials, and similar known fats and fatty oils.

The utility of the stabilizing antioxidants embodying the invention is illustrated in Table I. The two stabilizing materials employed were used in a concentration of 0.01% by weight based on the weight of the material being stabilized, and the stabilizing activity was measured by the active oxygen method (AOM). In this method, the composition being tested is heated to a temperature of about 95–100° C. with air bubbling through the sample, and the build-up of peroxide in the composition is examined. The table sets out the number of hours required for formation of 20 milliequivalents of peroxide per kilogram of fatty material (meq./kg). Item 2 in the table (BHA) is included to illustrate the relatively lower effectiveness of the compounds known in the prior art as compared to the compounds covered by this invention. BHA is a commercial antioxidant mixture of the isomers of tertiarybutyl-4-methoxy phenol and is widely used for the stabilization of fats and fatty oils.

TABLE I

*Effectiveness of 1-phenyl-3,5-pyrazolidinedione as an Antioxidant*

| Compound (001% by weight) | AOM Data—Lard A | |
| --- | --- | --- |
| | Hrs. | A. I. |
| Control (no antioxidant) | 13.0 | |
| BHA (Butylated Hydroxyanisole) | 27.0 | 1.0 |
| 1-Phenyl-3,5-pyrazolidinedione | 58.0 | 3.2 |

Similar results can be obtained in the stabilization of other oxidizable materials such as peanut oil, cottonseed oil and the like. For example, 1-phenyl-3,5-pyrazolidinedione can be employed for the stabilization of peanut oil as well as cottonseed oil whereby the antioxidant index (A. I.) compared to the well-known stabilizer BHA, is approximately two and in some cases even greater than two. Other compounds coming within the scope of the above general formula produces similar results, for example, 1-(3,5-dimethylphenyl)-3,5-pyrazolidinedione can be employed for the stabilization of cottonseed oil so as to obtain an antioxidant index compared to BHA of greater than two. Similarly, 1-(p-diphenyl)-3,5-pyrazolidinedione can be employed in an amount of from 0.02% by weight of peanut oil so as to obtain a stabilized composition having an antioxidant index greater than two as compared to BHA. Analogous results can also be obtained employing other compounds coming within the scope of this invention such as 1-(p-hydroxyphenyl)-3,5-pyrazolidinedione, 1-(2,5-dihydroxyphenyl)-3,5 - pyrazolidinedione, 1 - (p - hydroxyhexylphenyl)-3,5-pyrazolidinedione, etc.

In order to further illustrate the unexpected results obtained by our invention, Table II is presented to show that several of the closely related compounds which do not come within the scope of the general formula set forth above are not useful antioxidants.

TABLE II

*Effectiveness of substituted 3,5-pyrazolidinediones as antioxidants*

| Compound (0.01% by weight) | Structure | AOM Data | | | |
| --- | --- | --- | --- | --- | --- |
| | | Lard A | | Lard B | |
| | | Hrs. | A. I. | Hrs. | A. I. |
| 1. Control | | 13.0 | | 8.0 | |
| 2. BHA (Butylated Hydroxyanisole). | 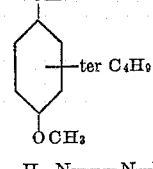 | 27.0 | 1.0 | 26.0 | 1.0 |
| 3. 4,4-Diethyl-3,5-pyrazolidinedione. | 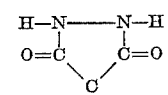 | 14.0 | 0.0 | | |
| 4. 1-Methyl-3,5-pyrazolidinedione. | 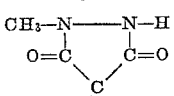 | | | 14.0 | 0.3 |
| 5. 1-Phenyl-4-ethyl-3,5-pyrazolidinedione. | 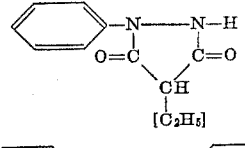 | | | 13.0 | 0.3 |
| 6. 1,2-Diphenyl-3,5-pyrazolidinedione. | 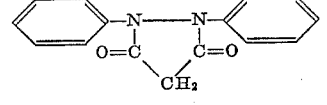 | 13.0 | 0.0 | | |

As can be seen from Table II, the dialkyl substituent in the 4-position of 3,5-pyrazolidinedione produces a compound of no antioxidant value (item 3 in the table). Item 4 of the table shows that a methyl substituent in the 1-position of the 3,5-pyrazolidinedione nucleus is ineffective. Item 5 of the table shows that even when a phenyl substituent is present in the 1-position, the additional presence of an alkyl group in the 4-position results in a compound of no appreciable antioxidant value. Moreover, when a symmetrical compound is produced by replacing the hydrogen atoms on both nitrogen atoms of the 3,5-pyrazolidinedione nucleus, the resulting compound is of no appreciable antioxidant value (see item 6 of the table).

The discussion of Table II clearly shows the unexpected nature of the discovery that 1-phenyl-3,5-pyrazolidinedione and certain related compounds are very potent antioxidants.

Although the invention has been described in detail with particular reference to preferred embodiments thereof, variations and modifications can be effected within the spirit and scope of the invention as described hereinabove and as defined in the appended claims.

Although the 1-phenyl-3,5-pyrazolidinediones of this invention include known compounds and have been described in some instances in the prior art, the following description is set forth in further illustration as to how such compounds can be prepared.

In general the preparation of the subject antioxidants can be formulated as follows:

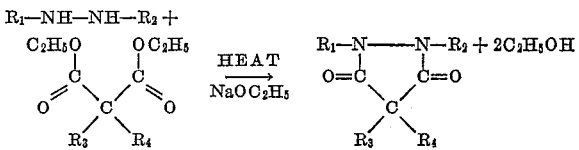

EXAMPLE 1.—PREPARATION OF 1-PHENYL-3,5-PYRAZOLIDINEDIONE

A solution of sodium ethoxide was prepared from 2.3 g. (0.1 g. atom) of sodium and 50 ml. of ethanol. To this was added 10.8 g. (0.1 mole) of phenylhydrazine and 16.0 g. (0.1 mole) of diethyl malonate. The mixture was slowly heated in an oil bath to distill out the ethanol. After removal of the ethanol the residue was held at 190°–210° C. for two hours. The residue was then dissolved in hot water. The solution was filtered, cooled, and acidified. On further cooling an orange-yellow solid separated. The product, M. P. 175°–180° C. with decomposition, weighed 3 grams.

EXAMPLE 2.—PREPARATION OF 1,2-DIPHENYL-3,5-PYRAZOLIDINEDIONE

In a manner exactly analogous to that of Example 1, 5 g. of 1,2 - diphenyl - 3,5 - pyrazolidinedione, M. P. 200°–210° C. with decomposition, was obtained from 2.3 g. (0.1 g. atom) of sodium, 50 ml. of ethanol, 18.6 g. (0.1 mole) of 1,2-diphenylhydrazine, and 16 g. (0.1 mole) of diethyl malonate.

EXAMPLE 3.—PREPARATION OF 4-ETHYL-1-PHENYL-3,5-PYRAZOLIDINEDIONE

In a manner exactly analogous to Example 1, 19 g. of this substance, M. P. 103–105° C., was obtained from 2.3 g. (0.1 g. atom) of sodium, 50 ml. of ethanol, 10.8 g. of phenylhydrazine, and 18.8 g. of diethyl ethylmalonate.

We claim:
1. A fatty material normally subject to oxidation stabilized with a compound having the following general formula:

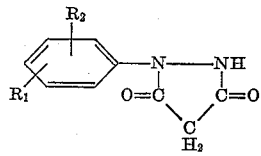

wherein each of $R_1$ and $R_2$ represents a substituent selected from the group consisting of a hydrogen atom, an alkyl radical containing from 1 to 8 carbon atoms, an alkoxy radical containing from 1 to 8 carbon atoms, an aryl radical of the benzene series containing from 6 to 9 carbon atoms, and a hydroxy radical.

2. A fatty material from the class consisting of fats and fatty oils subject to oxidative deterioration and containing a stabilizing amount of a compound having the following general formula:

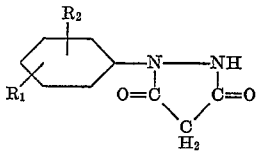

wherein each of $R_1$ and $R_2$ represents a substituent selected from the group consisting of a hydrogen atom, an alkyl radical containing from 1 to 8 carbon atoms, an alkoxy radical containing from 1 to 8 carbon atoms, an aryl radical of the benzene series containing from 6 to 9 carbon atoms, and a hydroxy radical.

3. A fatty material from the class consisting of fats and fatty oils subject to oxidative deterioration containing from about 0.001% to about 1% by weight of a compound having the following general formula:

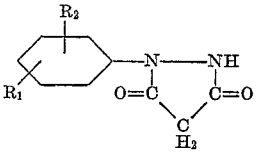

wherein each of $R_1$ and $R_2$ represents a substituent selected from the group consisting of a hydrogen atom, an alkyl radical containing from 1 to 8 carbon atoms, an alkoxy radical containing from 1 to 8 carbon atoms, an aryl radical of the benzene series containing from 6 to 9 carbon atoms, and a hydroxy radical.

4. A material as defined by claim 3 containing 1-phenyl-3,5-pyrazolidinedione.

5. A material as defined by claim 3 containing 1-(p-diphenyl)-3,5-pyrazolidinedione.

6. A material as defined by claim 3 containing 1-(p-hydroxyphenyl)-3,5-pyrazolidinedione.

7. A material as defined by claim 3 containing 1-(2,5-dihydroxyphenyl)-3,5-pyrazolidinedione.

References Cited in the file of this patent
UNITED STATES PATENTS

| | | |
|---|---|---|
| 2,427,911 | Kendall et al. | Sept. 23, 1947 |
| 2,458,780 | Howland | Jan. 11, 1949 |